M. L. MASTEN.
STENOGRAPHIC WRITING MACHINE.
APPLICATION FILED APR. 24, 1914.
1,295,782. Patented Feb. 25, 1919.
7 SHEETS—SHEET 6.
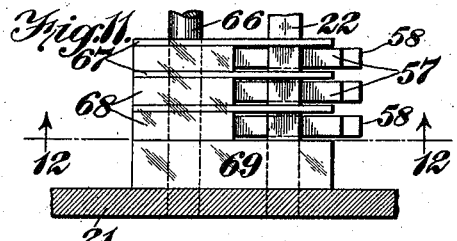
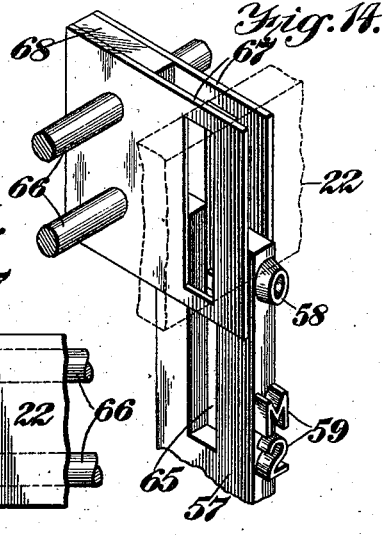
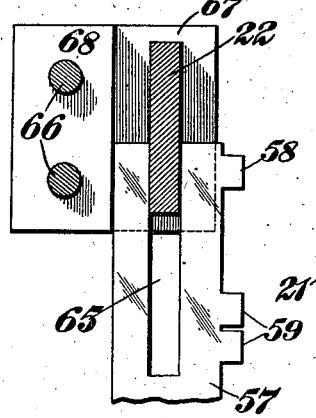
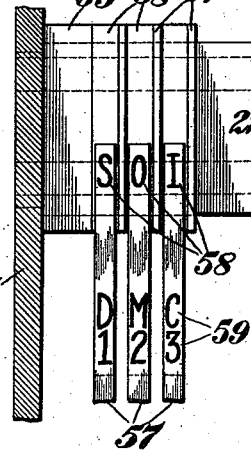
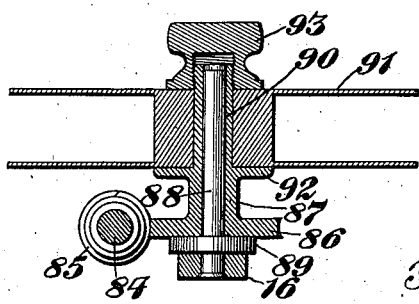
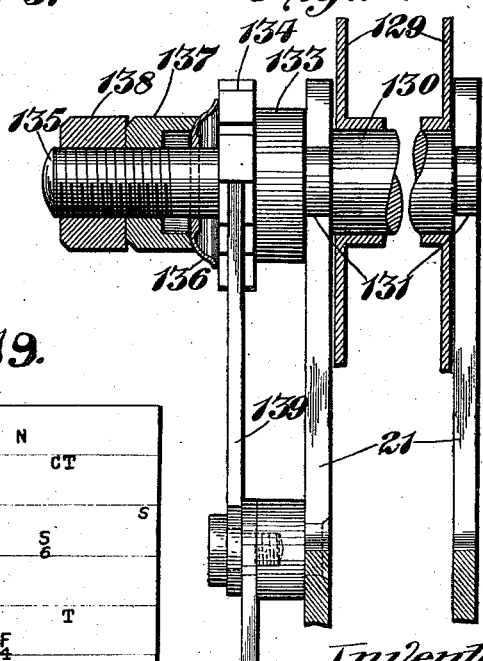
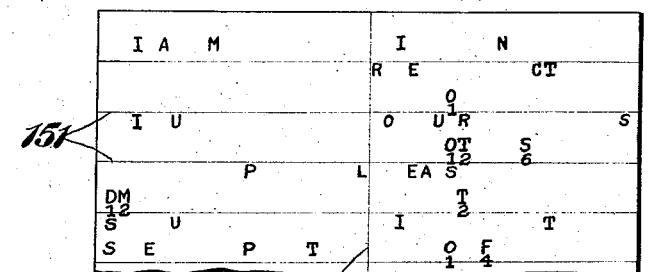
Inventor
Matthew Leroy Masten
by John H. Bruninga
His Attorney.
Attest:
Chas. A. Becker.
A. B. Cremer.

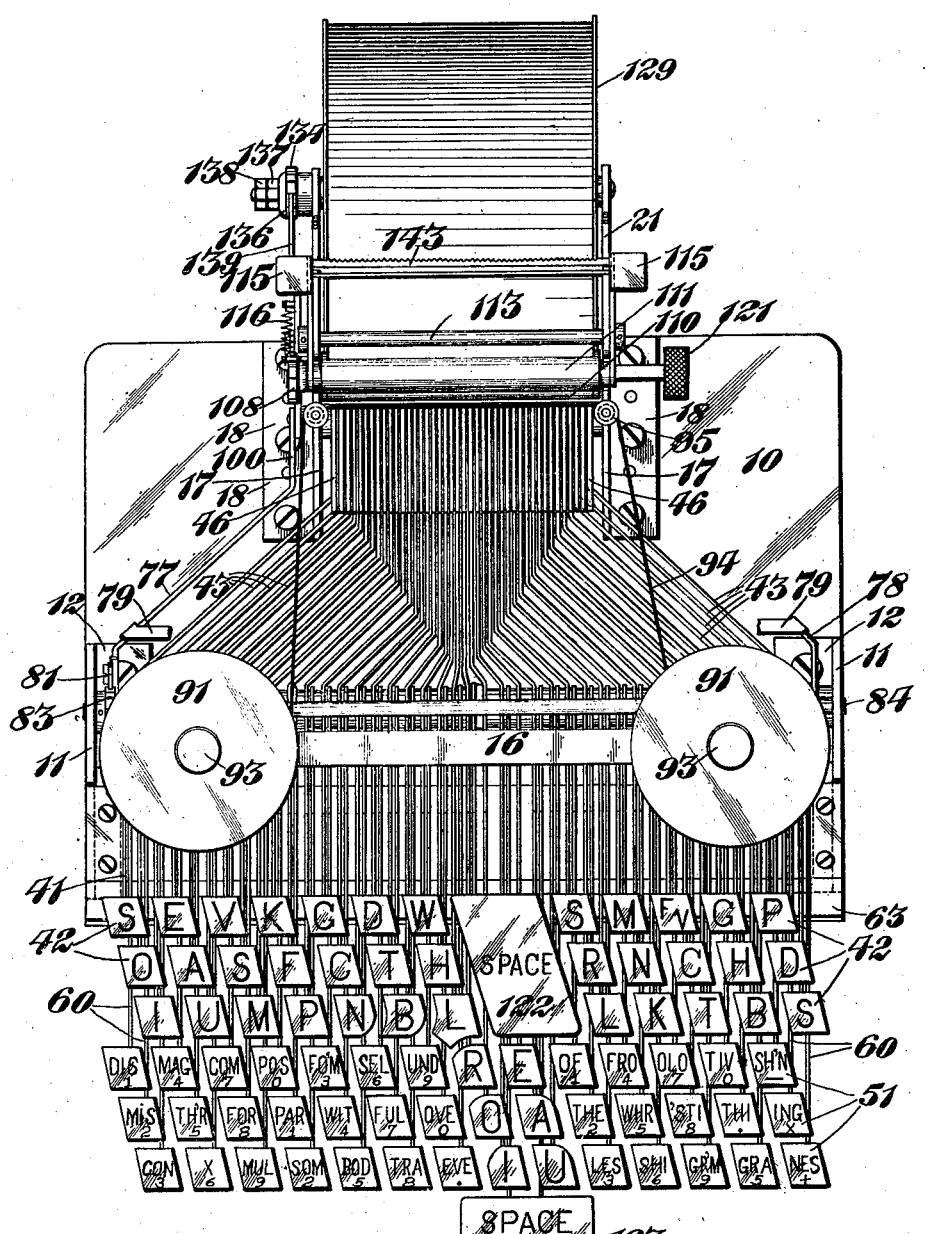

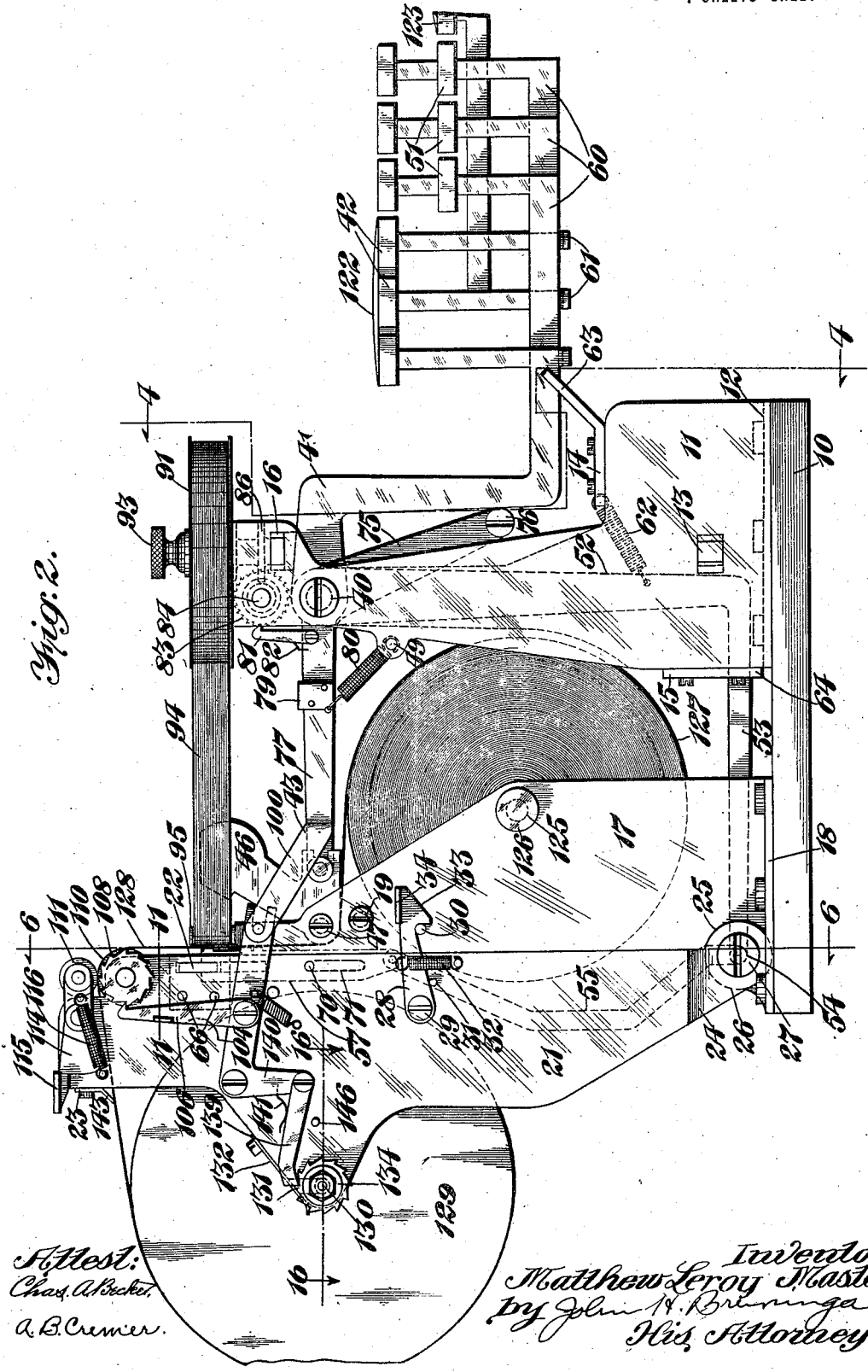

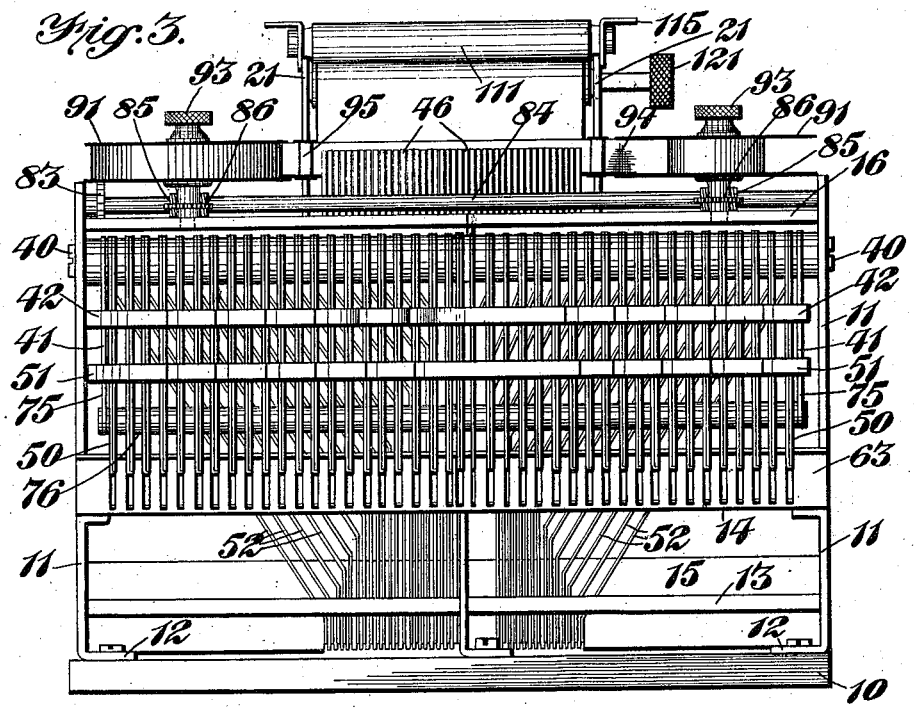
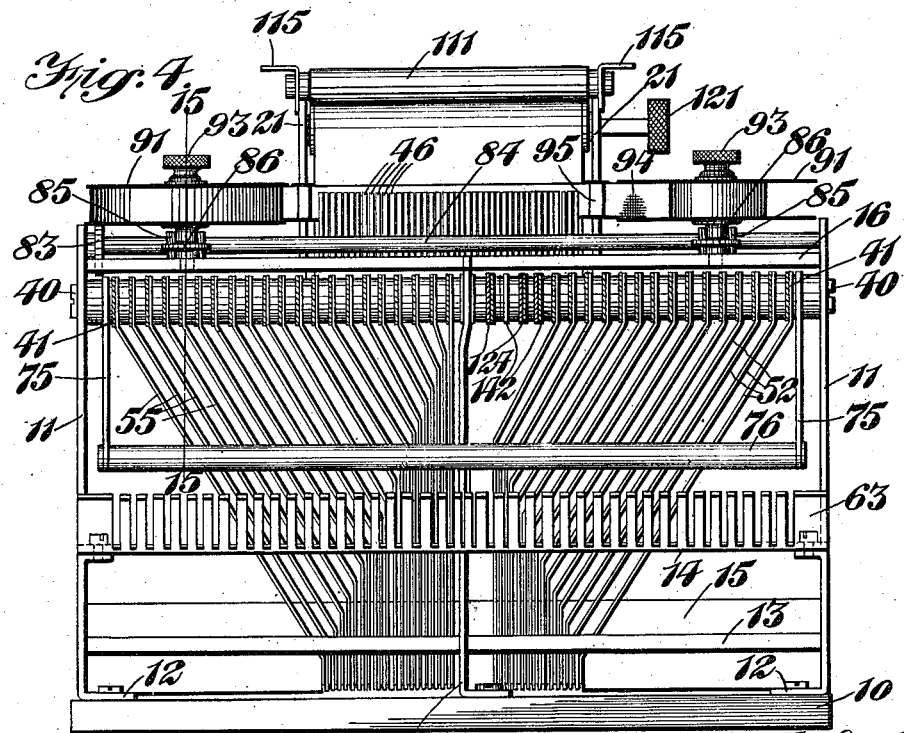

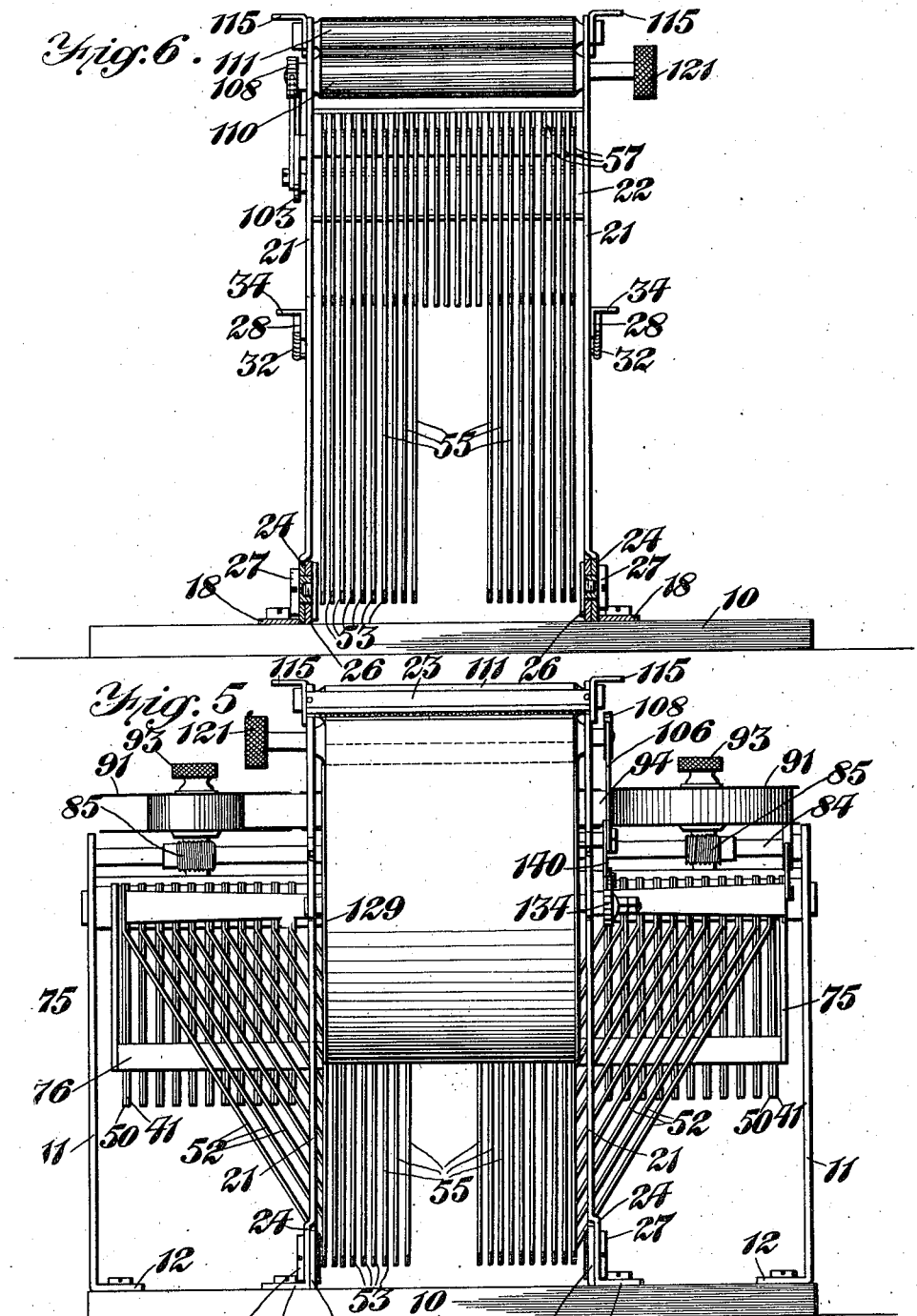

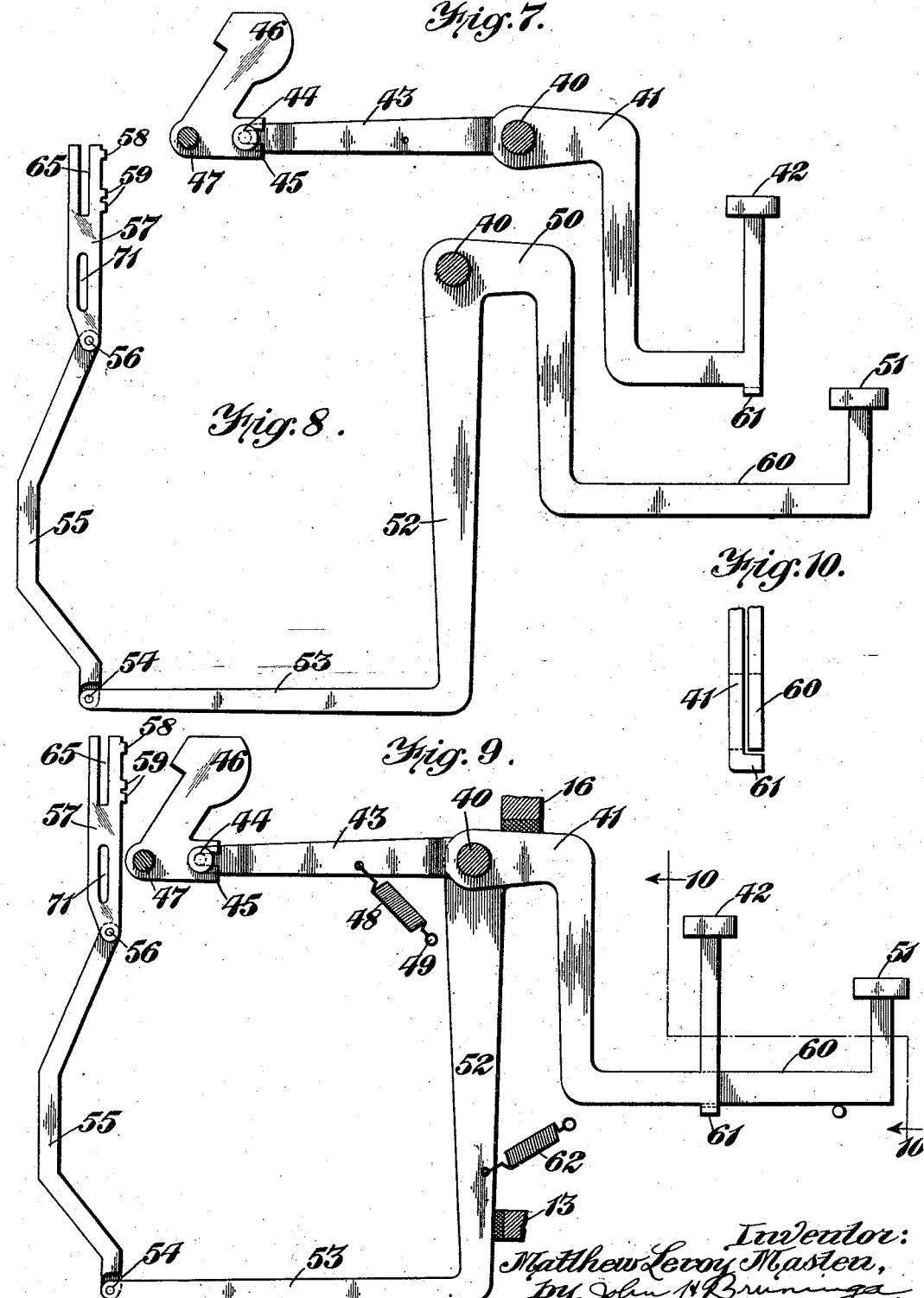

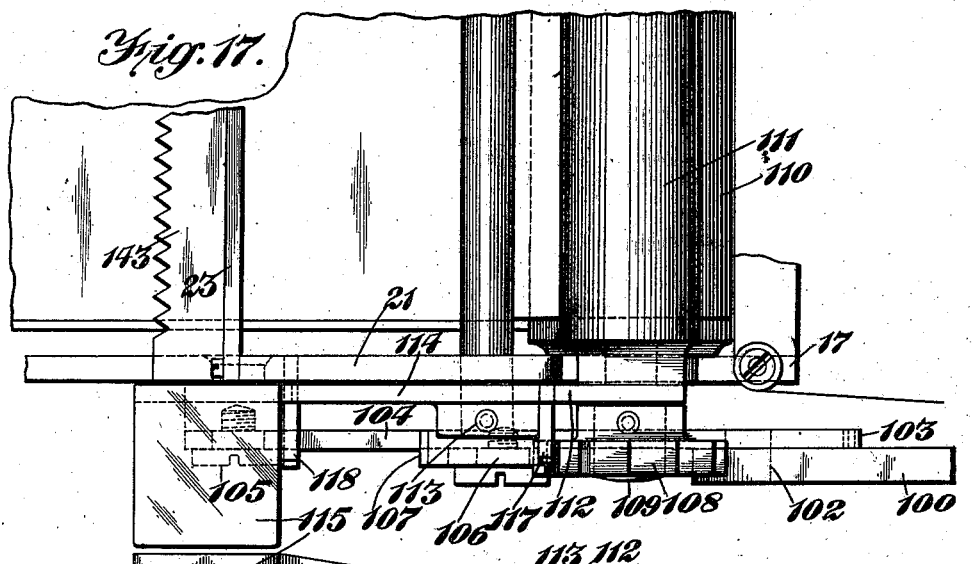
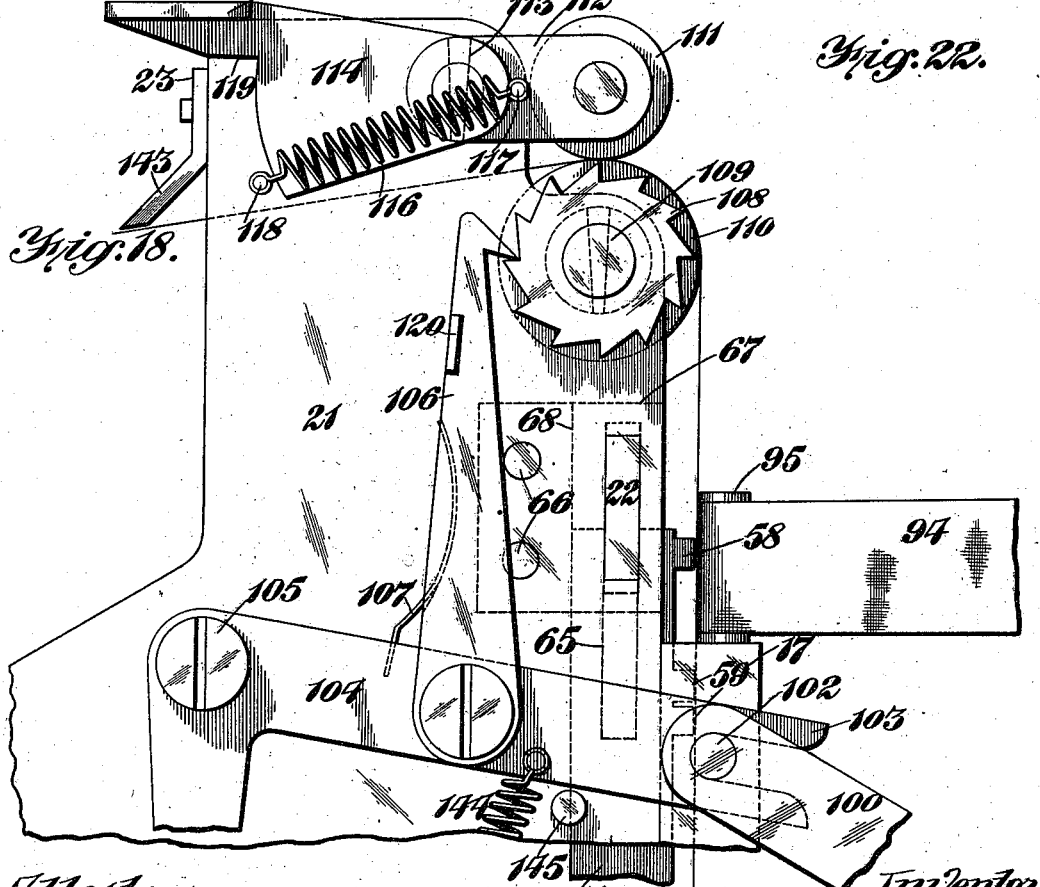

UNITED STATES PATENT OFFICE.

MATTHEW L. MASTEN, OF ST. LOUIS, MISSOURI, ASSIGNOR TO INTERNATIONAL MASTENTYPE COMPANY, OF WILMINGTON, DELAWARE, A CORPORATION OF DELAWARE.

STENOGRAPHIC WRITING-MACHINE.

1,295,782.

Specification of Letters Patent. Patented Feb. 25, 1919.

Application filed April 24, 1914. Serial No. 834,041.

*To all whom it may concern:*

Be it known that I, MATTHEW LEROY MASTEN, a citizen of the United States, and residing at St. Louis, in the State of Missouri, have invented certain new and useful Improvements in Stenographic Writing-Machines, of which the following is a specification.

This invention relates to typewriters, and more particularly to stenographic typewriters.

Stenographic typewriters are provided with type operating keys, any number of which are adapted to be struck simultaneously to concurrently print a plurality of characters in a line on a strip of paper. The paper is spaced before or after the operation of the keys. The paper strip should be narrow, so as to facilitate the reading of the record. The stroke of the keys should be small, the operation of the machine noiseless, and the machine, as a whole, should be light and simple in construction and operation.

Some of the objects of this invention are, to provide a machine of the above character which is so constructed that a maximum number of characters may be printed in a single row of printing with a minimum width of paper; in which the stroke of the keys and key bars will be small; which is noiseless in its operation, of light weight, and simple in construction and operation.

Other objects are, to provide a machine in which the keys are divided into a plurality of general groups, with the type bars or carriers each provided with a plurality of type, so that each key bar is operated by a key from each group to cause one or the other type to make an impression.

Other objects are, to provide novel printing or type mechanism, and more particularly, printing mechanism in which each type carrier is provided with a plurality of type, together with novel means for shifting the carriers to bring any one of the type to the printing point.

Further objects will appear from the detail description taken in connection with the accompanying drawings, in which, Figure 1 is a plan view of a typewriter embodying this invention, Fig. 2 is a side elevation, Fig. 3 is a front elevation, Fig. 4 is a section on the line 4—4, Fig. 2, Fig. 5 is a rear elevation, Fig. 6 is a section on the line 6—6, Fig. 2, Fig. 7 is a detail side elevation of one of the key bars and the printing element operated thereby, Fig. 8 is a detail side elevation of another key bar and the printing element operated thereby, Fig. 9 is a detail side elevation showing the relation of the mechanisms shown in Figs. 7 and 8, Fig. 10 is a section on the line 10—10, Fig. 9.

Fig. 11 is an enlarged detail section on the line 11—11, Fig. 2, showing the type bars and their guides, Fig. 12 is a section on the line 12—12, Fig. 11, Fig. 13 is a front elevation of Figs. 11 and 12, Fig. 14 is a perspective view, Fig. 15 is a section on the line 15—15, Fig. 4, showing the ribbon feeding mechanism, Fig. 16 is a section on the line 16—16, Fig. 2, showing the rewinding mechanism, Fig. 17 is an enlarged detail plan view of Fig. 1, showing the paper feeding mechanism, Fig. 18 is an enlarged detail side elevation of Fig. 17, and Fig. 19 is a view of the record strip.

Referring to the accompanying drawings, 10 designates a suitable base having mounted thereon a pair of side plates 11, 11, provided with laterally extending flanges 12, whereby they are secured to the base. These side plates are connected by cross bars 13, 14, 15 and 16, so as to form a rigid frame. A pair of side plates 17, 17 are mounted on the base and secured thereto by screws passing through lateral flanges 18. These side plates may be further connected by a cross bar 19, so as to form a rigid frame. A pair of side plates 21 are connected by cross bars 22 and 23, so as to form a rigid frame, and the lower ends of these plates are turned outwardly, as shown at 24, and provided with forwardly extending lugs 25, so as to lap over and engage rearwardly extending lugs 26 on the side plates 17. Studs 27, pass through the lugs 25, 26, so as to form a pivotal joint between the frames 17 and 21. A pair of latches 28 are pivoted at 29 on the frame 21, and these latches are provided with hooked ends adapted to take over pins 30 on the frame 17. The latches are moved downwardly into engagement with stops 31 by springs 32, each attached, at one end, to the latch and, at the other end, to the frame 21. The ends of the latches are beveled, as shown at 33, and provided with laterally turned lugs 34 to facilitate their operation.

The machine thus comprises a stationary frame-work and a movable frame pivoted thereto and adapted to be moved into and out of coöperative relation therewith. By lifting the latches out of engagement with the pins 30, the frame 21 may be swung rearwardly, and when moved back into position, the latches automatically engage and snap over the pins 30.

*The type mechanism.*—Referring more particularly to Figs. 1 to 4 inclusive and 7 to 10 inclusive, 40 designates a shaft connecting the side plates 11. This shaft forms a pivot for two series of key bars, the key bar of one series being shown in Fig. 7, and the key bar of the other series being shown in Fig. 8.

A key bar 41, pivoted at 40, is provided with a key 42 and a rearwardly extending arm 43 having a laterally extending headed pin 44 engaging the forked arm 45 of a hammer or platen member 46 pivoted on a shaft 47 mounted in and connecting the side plates 17. The hammers are arranged close together, as shown in Figs. 1, 3 and 4, and these hammers are spaced by washers or collars on the shaft 47, as is usual in devices of this character. The key bars are spaced farther apart on the shaft than the hammers, and the arms 43 accordingly converge toward the center of the machine, as shown in Fig. 1. Each key bar is provided with a spring 48 connected, at one end, to the arm 43 and, at the other end, to a bar or shaft 49 connecting the side plates 11. These springs operate to normally hold the key bars in engagement with the cross bar 16, this cross bar acting as a stop and being provided with a cushion, as shown in Fig. 9.

A key bar 50, pivoted at 40, is provided with a key 51 and a downwardly and rearwardly extending arm 52, 53, jointed at 54 to a link 55, which is, in turn, jointed at 56 to a type bar or carrier 57. This type bar or carrier is provided with two series of type 58 and 59 respectively. The key bars 41 and 50 are arranged side by side on the shaft 40, and alternate so that a key bar 50 will be arranged laterally of a key bar 41. A forwardly extending part 60 of the key bar 50 lies over a laterally extending lug 61 on the adjacent key bar 41, so that depression of the key bar 50 will cause the adjacent key bar 41 to be swung on its pivot. Each key bar 50 has a spring 62 connected, at one end, to the arm 52 and, at the other end, to the cross bar 14, and is arranged to hold the key bar in engagement with the cross bar 13, which forms a stop, and is provided with a suitable cushion, as shown in Fig. 9. The type bars 57 are arranged close together opposite the hammers 46, and the arms 52, 53 accordingly converge toward the center of the machine, as shown in Figs. 1, 3, 4 and 5. The key bars 41 and 50 are maintained in spaced relation in pairs on the shaft 40 by means of collars, as is usual in machines of this character, and the cross bars 14 and 15 are slotted at 63 and 64 respectively, and as shown in Figs. 3 and 4, to guide the key bars in their movements.

Each type bar 57 is slotted or forked, as shown at 65, to embrace and engage the deep cross bar 22. A pair of cross bars or rods 66, connecting the side plates 21, have strung thereon plates 67 and 68 respectively. The plates 67 engage the sides of the type bars and hold them in spaced relation, while the plates 68 space the guide plates 67 and engage the rear edges of the type bars to incidentally take up the impact of the hammers on the type. The filling plates 69 space the type bars from the sides 21 of the frame. A cross bar 70, engaging the slots 71, may be provided to further guide the type bars in their movements.

Certain of the center type bars 72, as shown in Fig. 6, have no corresponding keys 51, and these type bars are accordingly fixed against vertical movement, as shown in Fig. 22.

The type bars 57 and 72 are maintained in spaced relation opposite the corresponding hammers 46, so that the hammers will coöperate with the type thereon to make an impression. The type bars 57 are so arranged with respect to the hammers 46, that a hammer 46 will be in alinement with that type bar whose connected key bar 50 is positioned adjacent to the corresponding keybar 41 of the hammer. In this way, the depression of any key 51 will operate the hammer positioned in alinement with the type bar connected to that key. The parts are so constructed that the upper type 58 will normally be at the printing point opposite the corresponding hammer 46. When, therefore, a key 42 is depressed, the connected hammer will coöperate with the upper type 58 to make an impression. When, however, the key 51 is depressed, the type bar 57 will be shifted to raise the lower type 59 to the printing point, and the key bar 60 will engage the lug 61 on the adjacent key bar 41 to cause the connected hammer 46, in alinement with the shifted key bar, to coöperate with the type 59 and make an impression. By referring to Figs. 9 and 10, it will be noted that there is a slight clearance between the key bar 60 and the lug 61 on the adjacent key bar 41. This clearance is provided to insure that the lower type 59 will be at the printing point before the hammer 46 coöperates therewith to make an impression.

In referring to Figs. 1 and 2, it will be seen that the keyboard comprises two general groups. One group is provided with letters, and the other with syllables and figures. The syllable group is positioned at a lower level than the letter group. The letter group comprises the keys 42 which are connected to operate the hammers, while the syllable group comprises the keys 51 which are connected to shift the type bars. The letter keys of the letter group positioned between the keys of the syllable group, are connected to operate hammers positioned opposite the key bars 72. It will, therefore, be seen that the depression of a key in the letter group will simply operate the hammers to cause them to coöperate with the upper type 58, which correspond to the letters on the letter keys, without shifting the type bars. Operation of the syllable keys will, however, shift the corresponding type bars to aline the type 59, corresponding to the syllables on the syllable keys, with the hammers, and operate the corresponding hammers to make an impression.

*The ribbon feed mechanism.*—Referring more particularly to Figs. 1 to 4 inclusive and 15, 75 designates a pair of arms pivoted on the shaft 40 and connected, at their lower ends, by a cross bar 76. The arms 75 have forwardly extending parts 77 and 78 connected and braced by a cross bar 79. A spring 80 connects the arm 77 with the cross bar 49 so as to normally swing the arms 75 to the right, Fig. 2, and hold the cross bar 76 in engagement with the key bars 41 and 50. Another spring may connect the arm 78 with the frame. A pawl 81 is pivoted on the arm 77 and is maintained by a spring 82 in engagement with a ratchet 83, on one end of a shaft 84 mounted for rotation in the side plates 11. The shaft 84 is provided with mechanism for rotating the ribbon spools, and since the mechanisms are duplicate, only one will be described in detail. A worm 85 on the shaft 84 meshes with a worm wheel 86 on an arbor 87 mounted for rotation on a vertical stem 88 riveted to the cross bar 16 and provided with a collar 89 to support the armor. The arbor 87 has a reduced part 90 adapted to receive the ribbon spool 91, which is adapted to rest on the flange 92, and the end of the reduced part 90 is threaded to coöperate with a clamping nut 93. The ribbon spool is arranged to revolve on the arbor 87, but is adapted to be clamped thereto by tightening the nut 93. The ribbon 94 passes from one spool over guides 95 on the side plates 17 to the other spool. If one ribbon spool is firmly clamped to its arbor while the other is only lightly clamped to its arbor, the ribbon will wind from the loosely clamped spool on to the tightly clamped spool. In order to reverse the ribbon feed, the clamping action is reversed. Whenever one or more keys are depressed, the engagement of the key bar or key bars with the cross bar 76 will raise the arm 77 and cause the pawl 81 to ratchet over the ratchet teeth, and upon release of the key or keys, the spring 80 will operate in returning the arms 75 and 77 to move the ribbon. It will thus be seen that the ribbon is fed after the printing operation.

*The paper feed and line spacing mechanism.*—Referring more particularly to Figs. 1, 2, 17 and 18, 100 designates an extension of the arm 77, and this extension is provided with a laterally projecting pin 102, engaging the forked end 103 of a bell crank lever 104, pivoted at 105 on the side plate 21. A pawl 106 on the arm 104 is maintained by a spring 107 in engagement with a ratchet 108, connected to one end of a shaft 109, mounted to rotate in the side plates 21, and having mounted thereon a paper feed roll 110. A pressure roll 111 is mounted in a pair of arms 112, rigidly connected to a shaft 113, loosely mounted in the side plates 21. Each end of the shaft 113 has rigidly connected thereto an arm 114 provided with a finger piece 115. A spring 116 is connected, at one end, to a pin 117 on the arm 112 and, at its other end, to a pin 118 on the side plate 21. Oscillation of the arms 75, through the medium of the key bars, will cause an oscillation of the bell crank lever, and this will, in turn, cause a vertical reciprocation of the pawl 106. When one of the keys is depressed, the pawl 106 will be raised to ratchet over the teeth on the ratchet 108, and when the keys are released, the spring 80, returning the bell crank lever, will return the pawl 106 and cause it to rotate the feed roll 110 one space to feed the paper. It will, therefore, be seen that the paper is fed to space for a line, after the completion of the printing operation. The position of the pins 117 below the center of the shaft 113 normally causes the springs 116 to hold the pressure roll in yielding engagement with the feed roll. When, however, the finger pieces 115 are depressed to swing the arms 112 and 114 until the pins 117 are positioned above the center of the shaft 113, these springs will then operate to hold the pressure roll in raised position. A shoulder 119 is provided on each arm 114 to engage the pin 118 and act as a stop when the pressure roll is raised. The pawl 106 is provided with a finger piece 120, whereby it may be held out of engagement with the ratchet, and the shaft 109 is provided with a knurled knob 121 for manual operation.

Two space plates are provided. One of these space plates 122 is positioned in the letter group of keys, while the other space plate 123 is positioned in front of the keyboard. The space plate 122 extends lengthwise of the machine, while the space plate 123 extends crosswise of the machine. The space bars 124, supporting the space plate 122, and the space bars 142, supporting the space plate 123, as well as the space plate 122, are pivoted on the shaft 40 and are similar in shape to the key bars 41, except that the hammer operating arms 43 are omitted. Depression of either space plate will, therefore, operate to space the paper and the ribbon without printing.

*The paper rewinding mechanism.*—A shaft 125, provided with a knurled head 126 passes through one side plate 17 and screws into the other side plate. This shaft is arranged to pass through the core of a paper supply roll 127 and removably support this paper roll in position between the side members. Suitable mechanism may be provided for frictionally retarding the roll, or the fit of the core with the shaft 125 may be made sufficiently tight to retard the roll. The paper strip 128 passes from the supply roll 127 under and over the collars on the shaft 47, which act as guides, between the ribbon and the type bars, and between the feeding and pressure rolls 108 and 111 respectively. The strip then is wound on a rewinding roll carrier 129, which comprises a pair of side flanges and a core. This carrier is mounted on a shaft 130 reduced in diameter to take into slots 131 in the side plates 21, this shaft being maintained in position by spring clips 132. The shaft 130 has an enlarged collar 133, against which bears a ratchet 134, loosely mounted on a reduced part 135 of the shaft. A friction washer 136 bears against the ratchet 134, and is engaged by a collar 137 which is, in turn, clamped by a nut 138, so as to frictionally connect the ratchet with the shaft. A pawl 139 is mounted on an arm 140 of the bell crank lever, and is held in engagement with the ratchet by a spring 141. The plate 23 has a sharp serrated part 143 for cutting the paper strip.

Oscillation of the bell crank lever will cause an intermittent rotation of the rewinding roll 129. When a key or a space bar is depressed, the pawl 139 will ratchet over the ratchet 130, and when the key or space bar is released, the pawl will operate to engage the ratchet and move the rewinding roll, under the action of the spring 80. It will, therefore, be seen that the rewinding roll, as well as the paper feed roll and the ribbon feeding roll, is operated after the printing operation, and after the release of the keys or space bars. As the diameter of the rewinding roll increases, the angular movement must, of course, decrease. In view of the frictional connection between the ratchet and the rewinding roll, this ratchet will slip more and more as the diameter of the roll increases so as to keep the paper strip taut.

*Operation of mechanism.*—Any number of the keys, in either the letter or the syllable group, may be depressed at a single stroke to cause the coöperating type carriers and hammers or platen members to concurrently make impressions. All of the keys of either group may, in fact, be depressed at the same time. A key of one group may also be depressed with a non-adjacent key of the other group to concurrently make impressions. As pointed out above, when a key of the letter group is depressed, the hammer or platen member will be operated to coöperate with the upper type on the type carrier, while, when a key of the syllable group is depressed, the connected type carrier will be shifted to aline the lower type thereon with the hammer or platen member, and the alined hammer or platen member will be actuated to coöperate with the lower type. The depression of any one of the keys in either group will move the connected arms 75 and 77 to place the springs 80 under tension so as to shift the actuating pawls for the ribbon feed, paper feed, and paper rewinding mechanisms over their coöperating ratchets. As soon as the depressed key is released, the springs 80 will return the arms 75 and 77 and cause the pawls to move the ratchets one space, and thus feed or space the ribbon, the paper, and the rewinding roll. The ribbon and the paper are thus spaced, the latter for line spacing, at the completion of the printing operation. The action will be the same whether one or all of the keys are depressed. Moreover, the action of the ribbon feed and the paper feed and rewinding mechanisms is the same when either of the space plates is depressed. It will be noted that, as long as one key of either group, or even a space key, is maintained in depressed position, the ribbon, as well as the paper, will remain immovable, even though any of the other keys are successively depressed and released. Any number of characters may, therefore, be printed on a line by holding one of the keys depressed and then by successively depressing the other keys. The characters corresponding to the depressed keys will be printed in a single line of printing across the paper strip, so that each line of printing will represent the characters corresponding to the keys depressed at that stroke.

The feed of the ribbon can be reversed as pointed out by loosening one nut and tightening the other. The ribbon can also be readily removed and replaced. The paper feed can be adjusted manually by the knob 130

121, by throwing the pawl 106 out of coöperation with its ratchet. Moreover, by raising the pressure roll and adjusting the rewinding roll, the paper can be adjusted with respect to the paper feed for spacing the paper. The rewinding roll can be readily removed from the swinging frame by raising the clips. When this rewinding roll is removed, the pawl 139 will be held by its spring 141 against a stop 146 on the frame.

It will be noted that the supply roll 127 is positioned in the machine between the keys and the connected type carriers. The connections between the keys and the type carriers must, therefore, pass around the supply roll. In order to remove the supply roll, the latches 28 are raised out of engagement with their coöperating pins or keepers 30, and by then swinging the frame 21 backward, the roll will be exposed for removal, which is readily accomplished by removing the roll shaft 125. It will be noted that the pivotal connections 27, between the frames 21 and 17, are concentric with the pivotal connections 54 between the key bars and the type carriers. This permits the frame 21 to swing backwardly or forwardly without disturbing the relation of the type carriers with respect to the coöperating hammers or platen members. When the frame 21 is swung backwardly, the fork 103 will move out of engagement with the pin 102, while a light spring 144 holds the bell crank lever 104 against a stop 145 on the frame. When the frame 21 is swung back into coöperative relation with the frame 17, the fork and the pin will move automatically into engagement, the ends of the fork being slightly rounded to permit this engagement. With this construction, therefore, the connections between the key bars and the type carriers are placed in the machine below the printing point, so as to be entirely concealed. It is obvious that the machine may be provided with a suitable inclosing casing, which, however, is not shown in the drawings.

It is obvious that various changes may be made in the details of the construction of the machine, without departing from the spirit of this invention, and it is, therefore, to be understood that this invention is not to be limited to the specific details described and shown.

Having thus described the invention, what is claimed is:

1. In a stenographic writing machine, the combination with a paper carriage, of a series of type carriers having the type thereon arranged in a printing line, each carrier being provided with a plurality of type, said carriers being mounted for independent and concurrent shifting movement with respect to said carriage, to position one or more of said type in the printing line, a series of character keys connected to independently and concurrently shift said type carriers and said carriage relatively, whereby either of the type on a carrier may be positioned for printing, of a series of movable platen means, said platen means coöperating concurrently with the plurality of type on the carrier, one of said keys shifting a type carrier and moving its associated platen means, another of said keys only moving the platen means.

2. A stenographic writing machine comprising a paper carriage, a series of type carriers having the type thereon arranged in a printing line, each carrier being provided with a plurality of type, said carriers being mounted for independent and concurrent shifting movement with respect to said carriage, to position one or more of said type in the printing line, a series of character keys operable independently and concurrently, of a series of movable platen means, said platen means coöperating concurrently with the plurality of type to make an impression, one of said keys shifting a type carrier and moving its associated platen means, and another of said keys only moving the platen means, and means operated by said keys connected to independently and concurrently shift said type carriers and said carriage relatively, whereby either of the type on a carrier may be positioned for printing.

3. In a typewriter, the combination with a series of type carriers each provided with a plurality of type, of a series of movable platen means, said platen means coöperating concurrently with a plurality of said type to make an impression, and a plurality of keys for each carrier, one of said keys shifting a type carrier and moving its associated platen means, and another of said keys only moving the platen means.

4. In a typewriter, the combination with a series of type carriers each provided with a plurality of type, of a series of movable platen means, said platen means coöperating concurrently with a plurality of said type to make an impression, and a plurality of keys for each carrier adapted to cause said platen means to coöperate with the type on the carrier to make an impression.

5. In a typewriter, the combination with a series of type carriers, each provided with a plurality of type, of a series of movable platen means, said platen means coöperating concurrently with a plurality of said type to make an impression, and a plurality of keys for each carrier, one key being connected to shift its carrier, whereby either of the type on a carrier may be positioned for printing.

6. In a typewriter, the combination with a series of type carriers, each provided with a plurality of type, of a series of movable platen means, said platen means coöperating concurrently with a plurality of said type to make an impression, and a plurality of keys for each carrier, one key being connected to cause said platen means to coöperate with one type, and the other key being connected to shift the carrier and move its associated platen means into position for coöperation with the other type on its carrier.

7. In a typewriter, the combination with a series of type carriers, each provided with a plurality of type, of a series of movable platen means, said platen means coöperating concurrently with a plurality of said type to make an impression, and a plurality of keys for each carrier, one key being connected to cause said platen means to coöperate with one or the other of the type, and the other key being connected to shift its carrier to position one or the other type thereon in position for coöperation with its associated platen means.

8. In a typewriter, the combination with a series of type carriers, each provided with a plurality of type, of a series of movable platen means, said platen means coöperating concurrently with a plurality of said type to make an impression, and a plurality of keys for each carrier, each key being connected to move its carrier and said platen means relatively to make an impression, and one key being connected to shift its carrier and said platen means relatively to position one type in printing relation with respect to associated platen means.

9. In a typewriter, the combination with a series of type carriers, each provided with a plurality of type, of a series of movable platen means, said platen means coöperating concurrently with a plurality of said type, a key for each carrier connected to shift its carrier with respect to said platen means and move its carrier and associated platen means relatively to make an impression, and a key for each carrier connected to move its carrier and associated platen means relatively to make an impression.

10. In a typewriter, the combination with a series of type carriers provided with a plurality of type, of a series of movable platen members adapted to coöperate concurrently with a plurality of said type, a key bar connected to move each of said platen members and said type carrier relatively to make an impression, and a key bar connected to shift said platen and said type carrier relatively and operate said first key bar.

11. In a typewriter, the combination with a series of type carriers, each provided with a plurality of type, of a series of movable platen means coöperating with said type, a group of keys, each connected to move said platen means and said type carriers relatively to make an impression, and another group of keys, each connected to shift said platen means and said type carriers relatively, a plurality of said keys being operable at a single stroke to concurrently make a plurality of impressions.

12. In a typewriter, the combination with a series of type carriers, each provided with a plurality of type, of a series of movable platen means coöperating with said type, a group of keys, each connected to move said platen means and said type carriers relatively to make an impression, and another group of keys, each connected to shift said platen means and said type carriers relatively, a plurality of said keys in either group being operable at a single stroke to concurrently make a plurality of impressions.

In testimony whereof I affix my signature in the presence of these two witnesses.

MATTHEW L. MASTEN.

Witnesses:
J. H. BRUNINGA,
A. B. CREMER.